United States Patent [19]

Rorabaugh

[11] Patent Number: 4,664,646
[45] Date of Patent: May 12, 1987

[54] TREADMILL MOTOR DRIVE

[76] Inventor: Barre L. Rorabaugh, 8839 Production Ave., San Diego, Calif. 92121

[21] Appl. No.: 695,086

[22] Filed: Jan. 25, 1985

[51] Int. Cl.[4] ............................................. F16H 7/00
[52] U.S. Cl. ...................................... 474/88; 272/69
[58] Field of Search ..................... 474/88; 272/69, 134

[56] References Cited

U.S. PATENT DOCUMENTS

| | | | |
|---|---|---|---|
| 3,737,163 | 6/1973 | Sumrall | 272/69 |
| 3,837,291 | 9/1974 | Umlor | 474/88 X |
| 4,028,964 | 6/1977 | Jones | 474/88 X |
| 4,090,348 | 5/1978 | De Vittorio | 474/88 X |
| 4,363,480 | 12/1982 | Fisher et al. | 272/69 |

Primary Examiner—James A. Leppink
Assistant Examiner—Frank McKenzie
Attorney, Agent, or Firm—Robert A. Hirschfeld; James F. Duffy

[57] ABSTRACT

An efficient, narrow profile treadmill motor drive has a thin motor, a two-stage speed reduction using an intermediate countershaft between the motor and drive roller, a dual belt drive for the drive roller which reduces bearing stress, a support base of modular character facilitating removal and repair of the motor drive as a unit, and a motor-shaft mounted flywheel whose rotational inertia is effectively multiplied by the speed reduction ratio.

9 Claims, 2 Drawing Figures

TREADMILL MOTOR DRIVE

RELATED APPLICATION

A motor-driven treadmill is disclosed in the inventor's application Ser. No. 653,551, filed Sept. 9, 1984, entitled MULTIPLE DEVICE EXERCISE SYSTEM. Said disclosure, related to the disclosure of the present invention, teaches the engagement of a drive roller with the outside of an adjacent treadmill surface. The present invention teaches an interior drive structure which is an improvement over the disclosure of application Ser. No. 653,551.

DESCRIPTION

Technical Field

The invention relates to the field of exercise devices, and more particularly to exercise devices having integrally motor-driven treadmills.

Background Art

In his application Ser. No. 653,551, MULTIPLE DEVICE EXERCISE SYSTEM, the inventor disclosed a unified system of various exercise devices sharing a common extruded set of parallel tracks which could be conveniently folded into a wall mounted cabinet. One of said various exercise devices of application Ser. No. 653,551 is a motor-driven treadmill. To permit the assembled motor-driven treadmill to be foldable into said cabinet, the motor and its associated drive mechanism must occupy a space no wider than the width required by the tracks and treadmill itself associated with said folding exercise system.

Prior art treadmill motor drives have tended to be bulky. Motor diameters in prior art required to achieve sufficient torque were necessarily large, owing to the common prior-art practice of operating the motor shaft and treadmill drive shaft at the same or nearly the same rotational speed. In practical terms, electric motors having high torque and relatively low rotational speed involve bulkier armatures and surrounding structure than do highspeed, lower torque motors producing a comparable numeric product of torque and rotational speed. Therefore, prior-art treadmill drives generally involved a bulge, or protrusion at or near one end of the treadmill, to accommodate the motor, and are thus unsuitable to use in a lightweight folding exercise system.

The structure taught by the inventor in his said application Ser. No. 653,551 is a drive roller frictionally engaging the outside of the treadmill at one end of the treadmill, with said drive roller in turn driven by a belt disposed in an approximately central groove about a pulley surface necessarily smaller in diameter than the outer cylindrical surface of said drive roller. Thus, the pulley ratios implicit in application Ser. No. 653,551 would have the drive roller actually turning at higher, or at least equal speed to the motor shaft, an undesirable ratio in which relatively more torque at lower speed is demanded of the motor.

Further, it is desirable in a treadmill motor drive to add rotational inertia, which resists momentary increases in drag, such as when a person first steps upon the treadmill. Said inertia, in practical terms, reduces the demand for torque production, during such momentary resistive surges, upon the motor. In some prior-art treadmills, the primary supply of inertia came from the rotational mass of the idler rollers supporting the treadmill. However, excessively heavy idler rollers are undesirable in a lightweight treadmill intended to be carried or folded-up. Another source of inertia in prior-art treadmill drives was the inertia of the massive motor armature, sometimes supplemented by a massive flywheel upon the motor shaft. In a lightweight, foldable treadmill, however, an objective is to minimize motor mass, as well as mass of apparatus, such as a flywheel, associated with the motor.

There are practical limits to the maximum pulley ratio achievable in one stage of a belt-pulley system. If, as in the present invention, speed reduction and torque multiplication is deemed desirable from the motor to the treadmill, the larger, or treadmill-end pulley should be no larger diameter than the treadmill idler rollers, else the objective of a thin, foldable structure is not met. At the same time, the motor-end pulley in a single stage system cannot be so small a diameter that it cannot adequately frictionally engage a belt, or that a practical belt cannot be so sharply conformed to such a small diameter pulley. Thus, prior-art single stage pulley systems used for coupling a motor to a treadmill suffer from numerous inherent limitations.

Where a treadmill is to be driven by a roller internal to one of its ends, drive power must necessarily be applied to said roller beyond the engagement region of the treadmill itself. Where this has been done in prior-art treadmill motor drives, by a single pulley at one end of the drive roller, twisting forces are necessarily applied to the bearings supporting said roller in unequal fashion by the single-ended drive torque so applied, hastening wear, or requiring more massive bearings.

Therefore, it is an object of the present invention to provide a treadmill motor drive having a small, relatively lightweight drive motor.

It is a further object of the present invention to provide a treadmill motor drive having substantial rotational inertia without the use of heavy, massive parts.

Another object of the present invention is to provide a treadmill motor drive which fits within a narrow profile consistent with a lightweight, folding treadmill.

A still further object of the present invention is to provide a treadmill motor drive with reduced stress upon the bearings supporting the treadmill drive roller.

DISCLOSURE OF THE INVENTION

The invention is an improvement in a treadmill motor drive narrowly confined within the width profile of the treadmill idler rollers, and disposed as a series of shafts whose rotational axes form essentially a single plane, said plane intersecting also the rotational axes of the treadmill idler rollers. A thin, high speed, low torque motor drives through a single pulley and belt a countershaft at equal, or preferably lower rotational speed than the motor. The countershaft rotates in bearings at each of its ends, and has adjacent each countershaft end a pulley or pulley surface. From each said end-adjacent countershaft pulley surface, a separate belt drives a corresponding pulley surface of the treadmill drive roller adjacent drive roller end shafts borne by drive roller bearings. The ratio of drive roller pulley surface diameter to countershaft pulley surface diameter is such that the drive roller turns more slowly, or at least at the same speed, as the countershaft. The combination of the respective coacting pulley surface diameters is such that the motor shaft rotates at substantially higher speed than does the treadmill drive roller.

A moderate-mass flywheel is coupled concentrically to the motor shaft. Because of said relationship of pulley ratios, the relatively small flywheel's inertial effect is multiplied by the same ratio as the motor to drive roller speed reduction. The small motor's torque is multiplied by the same ratio.

The tandem or dual belt system by which the countershaft drives the drive roller places equal lateral force on the drive roller bearings, said force, as well as a comparable force in the motor-countershaft pulley system is adjustable for belt wear by sliding displacement of the countershaft bearings and the motor mount toward or away from the drive roller. The compact, modular assembly may be removed from the treadmill as a unit for service or storage when alternate forms of exercise are to be performed upon a universal exercise structure such as that disclosed in the inventor's application Ser. No. 653,551.

The invention, as disclosed, combines light weight, compactness, substantial torque and inertial capability.

The use of the countershaft permits a greater overall motor to treadmill drive roller speed reduction than is practical in a single-stage pulley system of prior art.

BEST MODE FOR CARRYING OUT THE INVENTION

Figure 1:
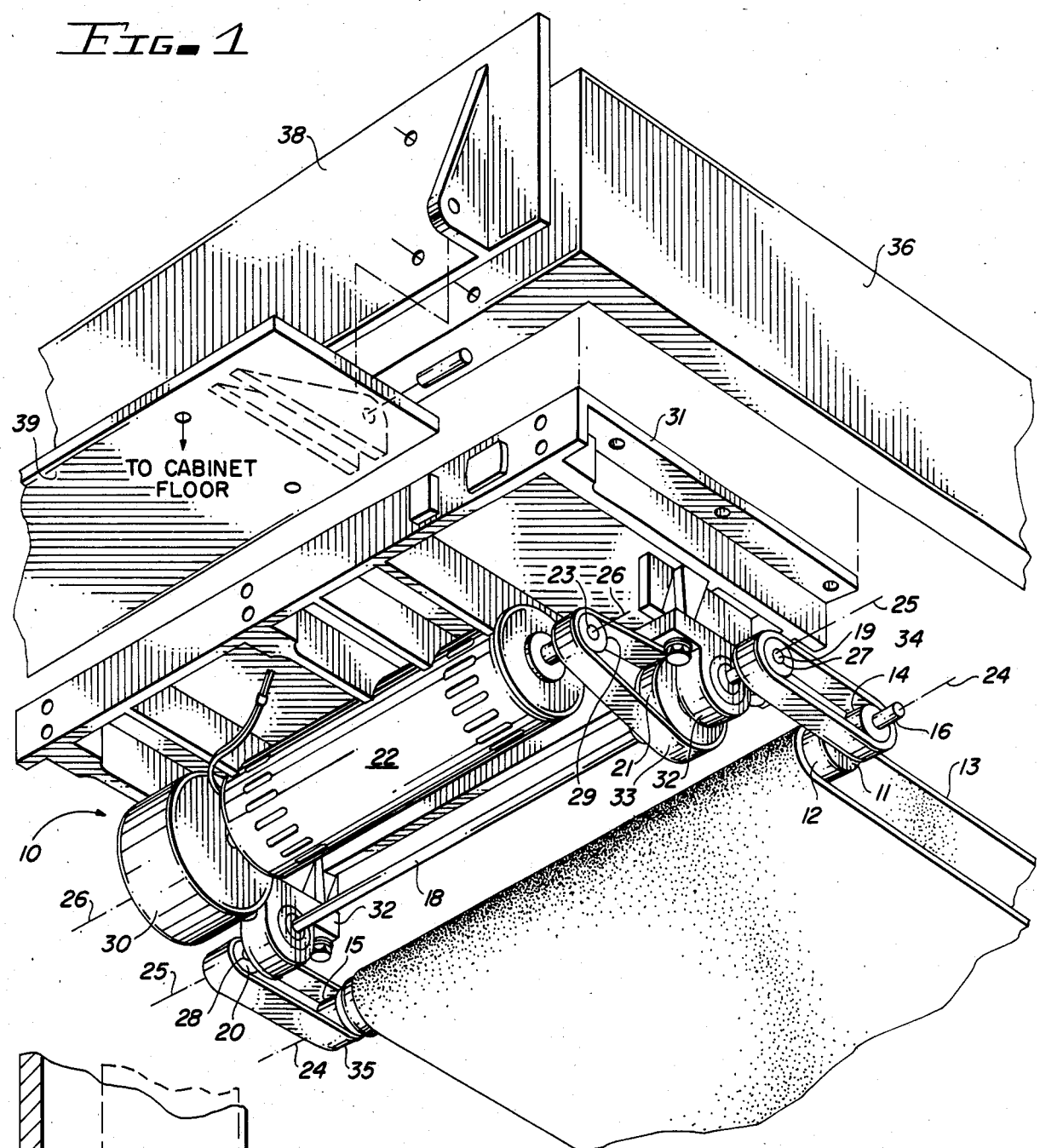
FIG. 1 is an upward-looking perspective view of the treadmill motor drive as attached to a cabinet-mounted treadmill.

For the purposes of promoting an understanding of the principles of the invention, reference will now be made to the embodiments illustrated in the drawings. Specific language will be used to describe the same. It will, nevertheless, be understood that no limitation of the scope of the invention is thereby intended, such alterations and further modifications in the illustrated device, and such further applications of the principles of the invention as illustrated therein being contemplated as would normally occur to one skilled in the art to which the invention relates.

The invention 10 is presented in perspective view, as seen from below, in FIG. 1. For clarity, only a portion of treadmill frame 36, treadmill 13, first hinge plate 38 and second hinge plate 39 are shown. It should be understood that although said frame 36 and hinge plates 38,39 illustrate a lightweight, cabinet-mounted folding treadmill, in which the compact, lightweight invention is particularly advantageous, the invention is also applicable to stationary or permanent treadmill apparatus.

Treadmill 13 is mechanically driven and mechanically braked by treadmill drive surface 12 of drive roller 11, about drive axis 24, also referred to as drive roller axis 24. First pulley surface 14 having a first diameter (not separately indicated) and second pulley surface 15 having a second diameter (not separately indicated) are spaced transverse treadmill drive surface 12 concentric drive axis 24, and are coupled to or integral with drive roller 11 respectively adjacent first end shaft 16 and second end shaft 17. End shafts 16,17 are borne by respective bearings (not shown) in treadmill frame 36. Said first diameter (not separately indicated) of said first pulley surface 14 equals said second diameter (not separately indicated) of said second pulley surface 15.

Countershaft 18 has concentric a countershaft axis 25 third pulley surface 19 having a third diameter (not separately indicated), and fourth pulley surface 20 having a fourth diameter (not separately indicated), said third and fourth pulley surfaces 19,20 laterally separated by a distance equalling the lateral spacing between first and second pulley surfaces 14,15. Said third and fourth diameters of pulley surfaces 19,20 are equal, and are preferably less than said first and second diameters of pulley surfaces 14,15, thereby producing a speed reduction from the countershaft 18 to the drive roller 11. Third and fourth countershaft end shafts 27,28, are borne by bearings 32. Bearings 32 are adjustably mounted upon support base 31 so as to adjustably vary spatial relationship between countershaft 18 and other portions of the invention.

Electric motor 22 having motor shaft 23 is adjustably mounted to support base 31. Concentric to motor shaft axis 26 of motor shaft 23, sixth pulley surface 29 having sixth diameter (not separately indicated) is positioned in line with said fifth pulley surface 21 of the countershaft 18. Transverse motor 22 from pulley surface 29, flywheel 30 is coupled concentric motor shaft axis 26 to motor shaft 23, to provide added rotational inertia. Preferably, said sixth diameter of the sixth pulley surface 29 is less than said fifth diameter of fifth pulley surface 21, to provide speed reduction from the motor shaft 23 to the countershaft 18. Thus, there is a two-stage speed reduction as shown between the motor shaft 23 and the drive roller 11.

Support base 31 has bearing means 32, in adjustable spaced relationship to motor 22 and drive roller 11. Motor 22 is mounted to support base 31 by means (not shown) well known in the art.

First drive belt 33 transmits rotational power from sixth pulley surface 29 to fifth pulley surface 21. Second drive belt 34 transmits approximately half of the rotational power between countershaft 18 and drive roller 11, while third drive belt 35 transmits the other approximate half therebetween. Second drive belt 34 encompasses first and third pulley surfaces 14,19. Third drive belt 35 encompasses second and fourth pulley surfaces 15,20. Belt tension adjustment means (not separately indicated) comprises the aforementioned adjustment of bearings 32, typically by provision of slots (not shown) at points of mounting. Drive belts 33,34,35 are illustrated as flat, non-toothed belts in FIGS. 1 and 2; however v-belts or toothed belts may be used instead, as is well known in the art, in conjunction with corresponding v-groove or toothed surfaces (not shown) on corresponding pulley surfaces.

Figure 2:
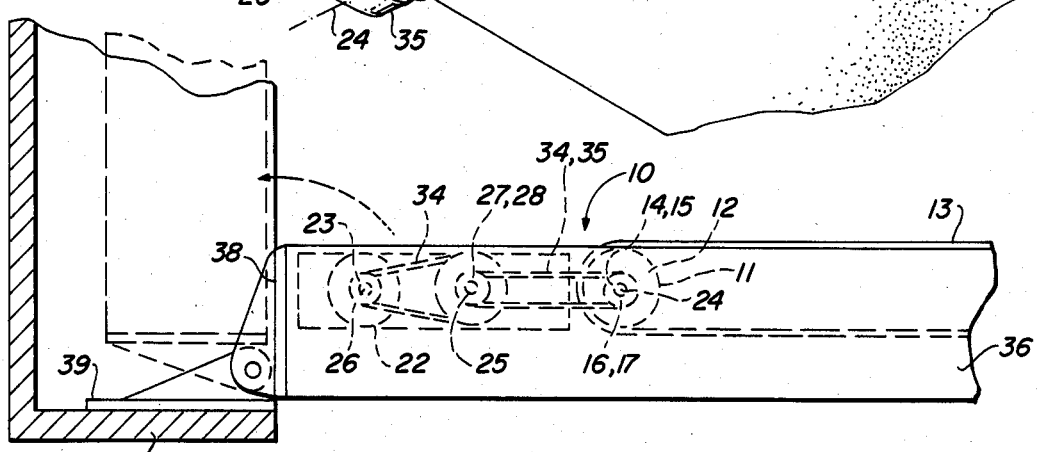
FIG. 2 is a side view of the treadmill motor drive.

FIG. 2 shows a hinged, fold-up treadmill frame 36 as horizontally disposed in use, and in phantom, as vertically folded. In FIG. 2, motor shaft axis 26, countershaft axis 25 and drive roller axis 24 are shown to lie in essentially a single plane. Thus, the advantages of the thin motor and pulley system of the present invention become apparent in facilitating construction of an easily foldable treadmill 36 into cabinet 37.

It should further be noted that the approximately equal division of power transmission duty between belts 34,35 reduces or eliminates twisting forces on drive roller end shafts 16,17, countershaft end shafts 27,28, and their respective bearings 32 (not shown for the drive roller bearings in frame 36).

What has been disclosed is an efficient, narrow profile treadmill motor drive having a thin motor, a two-stage speed reduction using an intermediate countershaft between the motor and the drive roller, a dual belt drive for the drive roller which reduces bearing stress in comparison to a single belt drive, and a support base of modular character which facilitates removal and repair of the motor drive as a unit. A flywheel upon the motor shaft turns at relatively higher speed than the drive roller, and thus has its rotational inertia effectively multiplied by the speed reduction ratio, thereby obtaining compact, lightweight but effective flywheel action relative to the treadmill.

Those skilled in the art will conceive of other embodiments of the invention which may be drawn from the disclosure herein. To the extent that such other embodiments are so drawn, it is intended that they shall fall within the ambit of protection provided by the claims herein.

Having described my invention in the foregoing description and drawings in such a clear and concise manner that those skilled in the art may readily understand and practice the invention, that which I claim is:

1. A treadmill motor drive comprising:

drive roller means having concentric a drive axis a treadmill drive surface, first and second pulley surfaces in spaced relationship transverse said treadmill drive surface, and first and second end shafts transverse said first and second pulley surfaces and said drive surface, said first pulley surface having a first diameter, said second pulley surface having a second diameter equal said first diameter;

countershaft means having concentric a countershaft axis, third and fourth pulley surfaces in spaced relationship corresponding to said spaced relationship of said first and second pulley surfaces of said drive roller means, a fifth pulley surface intermediate said third and fourth pulley surfaces, and third and fourth end shafts transverse said second, third and fourth pulley surfaces, said third pulley surface having a third diameter, said fourth pulley surface having a fourth diameter equal said third diameter;

electric motor means having motor shaft means, said motor shaft means having concentric a motor shaft axis a sixth pulley surface corresponding to said fifth pulley surface of said countershaft means, and flywheel means transverse said electric motor means from said sixth pulley service, said sixth pulley surface having a sixth diameter;

support base means having bearing means, said bearing means bearingly supporting said first, second, third and fourth end shafts in spaced relationship, said electric motor means coupled to said support base means;

first drive belt means drivingly coupling said fifth pulley surface and sixth pulley surface;

second drive belt means drivingly coupling said first pulley surface and said third pulley surface; and third drive belt means drivingly coupling said second pulley surface and said fourth pulley surface.

2. The treadmill motor drive of claim 1 wherein said drive axis, said countershaft axis and said motor shaft axis are within a single plane.

3. The treadmill motor drive of claim 1 wherein said equal third and fourth diameters of said third and fourth pulley surfaces are less than said equal first and second diameters of said first and second pulley surfaces, for rotation of said drive roller means at lower speed than said countershaft means.

4. The treadmill motor drive of claim 1 wherein said sixth diameter of said sixth pulley surface is less than said fifth diameter of said fifth pulley surface, for rotation of said countershaft means at lower speed than said motor shaft means.

5. The treadmill motor drive of claim 1 wherein said sixth diameter of said sixth pulley surface is less than said fifth diameter of said fifth pulley surface, said equal diameters of said first and second pulley surfaces no less than said equal diameters of said third and fourth pulley surfaces, for rotation of said drive roller means at lower speed than said motor shaft means and for multiplying the inertial effect of said flywheel means with respect to said drive roller means.

6. The treadmill motor drive of claim 1 further comprising belt tension adjustment means coupled between said support base means and said bearing means.

7. The treadmill motor drive of claim 1 wherein said drive belt means comprise flat belt means for coaction with cylindrical pulley surfaces.

8. The treadmill motor drive of claim 1 wherein said drive belt means comprise v-belt means for coaction with v-shaped pulley surfaces.

9. The treadmill motor drive of claim 1 wherein said drive belt means comprise toothed belt means for coaction with toothed pulley surfaces.

* * * * *